United States Patent
Yamaguchi

(10) Patent No.: US 9,406,440 B2
(45) Date of Patent: Aug. 2, 2016

(54) DIELECTRIC CERAMIC AND LAMINATED CERAMIC CAPACITOR

(71) Applicant: MURATA MANUFACTURING CO., LTD., Nagaokakyo-Shi (JP)

(72) Inventor: Shinichi Yamaguchi, Kyoto-Fu (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/287,678

(22) Filed: May 27, 2014

(65) Prior Publication Data

US 2014/0268489 A1    Sep. 18, 2014

Related U.S. Application Data

(63) Continuation of application No. 13/026,699, filed on Feb. 14, 2011, now abandoned.

(30) Foreign Application Priority Data

Feb. 24, 2010   (JP) .................................. 2010-038185

(51) Int. Cl.
*C04B 35/468* (2006.01)
*H01G 4/12* (2006.01)
(Continued)

(52) U.S. Cl.
CPC .............. *H01G 4/12* (2013.01); *C04B 35/4682* (2013.01); *C04B 35/62685* (2013.01); *C04B 35/638* (2013.01); *H01G 4/1227* (2013.01); *H01G 4/30* (2013.01); *H01G 13/00* (2013.01); *C04B 2235/3206* (2013.01); *C04B 2235/3224* (2013.01); *C04B 2235/3225* (2013.01); *C04B 2235/3227* (2013.01); *C04B 2235/3239* (2013.01); *C04B 2235/3262* (2013.01); *C04B 2235/3418* (2013.01); *C04B 2235/5445* (2013.01); *C04B 2235/652* (2013.01);
(Continued)

(58) Field of Classification Search
CPC .......................... H01G 4/1227; C04B 35/4682
See application file for complete search history.

(56) References Cited

U.S. PATENT DOCUMENTS 7,176,156 B2    2/2007   Umeda et al.
8,179,662 B2 *  5/2012   Yao ............................ 361/321.4
(Continued)

FOREIGN PATENT DOCUMENTS

JP    2005-145791 A    6/2005
JP    2005-194138 A    7/2005
(Continued)

OTHER PUBLICATIONS

Certified translation of JP2009051717, Mar. 2009.*
(Continued)

*Primary Examiner* — Karl Group
(74) *Attorney, Agent, or Firm* — Arent Fox LLP

(57) ABSTRACT

A laminated ceramic capacitor which has a long high temperature load life, small variations in life, large capacitance, high electrical insulation property, and favorable capacitance temperature characteristics, even when high strength electric field is applied while reducing the thickness of dielectric ceramic layers uses a dielectric ceramic represented by the formula: $100(Ba_{1-x}Ca_x)_m TiO_3 + aMgO + bVO_{5/2} + cReO_{3/2} + dMnO + eSiO_2$ where Re being at least one of Y, La, Sm, Eu, Gd, Tb, Dy, Ho, Er, Tm, and Yb), $0.05 \leq x \leq 0.15$, $0.01 \leq a \leq 0.1$, $0.05 \leq b \leq 0.5$, $1.0 \leq c \leq 5.0$, $0.1 \leq d \leq 1.0$, $0.5 \leq e \leq 2.5$, and $0.990 \leq m \leq 1.030$.

4 Claims, 1 Drawing Sheet

(51) Int. Cl.
   *C04B 35/626* (2006.01)
   *C04B 35/638* (2006.01)
   *H01G 4/30* (2006.01)
   *H01G 13/00* (2013.01)

(52) U.S. Cl.
   CPC ... *C04B2235/656* (2013.01); *C04B 2235/6582* (2013.01); *C04B 2235/6584* (2013.01); *C04B 2235/6588* (2013.01)

(56) References Cited

U.S. PATENT DOCUMENTS

| | | | |
|---|---|---|---|
| 8,445,397 B2 * | 5/2013 | Yamaguchi | 501/139 |
| 2007/0025060 A1 | 2/2007 | Kim et al. | |
| 2007/0045912 A1 * | 3/2007 | Sasaki | C04B 35/465 264/681 |
| 2009/0105064 A1 * | 4/2009 | Shimada | C01G 29/006 501/138 |
| 2010/0033895 A1 * | 2/2010 | Yao | 361/321.4 |
| 2012/0081836 A1 | 4/2012 | Yamaguchi | |

FOREIGN PATENT DOCUMENTS

| | | |
|---|---|---|
| JP | 2 06-287046 A | 10/2006 |
| JP | 2007-031273 A | 2/2007 |
| JP | 2007-197233 A | 8/2007 |
| JP | 2008-207972 A | 9/2008 |
| JP | 2009-051717 A | 3/2009 |
| JP | 2009-073721 A | 3/2009 |
| JP | 2010-040798 A | 2/2010 |
| TW | 2005-22102 A | 7/2005 |

OTHER PUBLICATIONS

Japanese Office Action issued for corresponding application JP2010-038185, Office Action dispatch date May 29, 2012 (with English translation).

Chinese Office Action issued for corresponding application CN201110038162.0, Office Action issuing date Aug. 27, 2012 (with English translation).

* cited by examiner

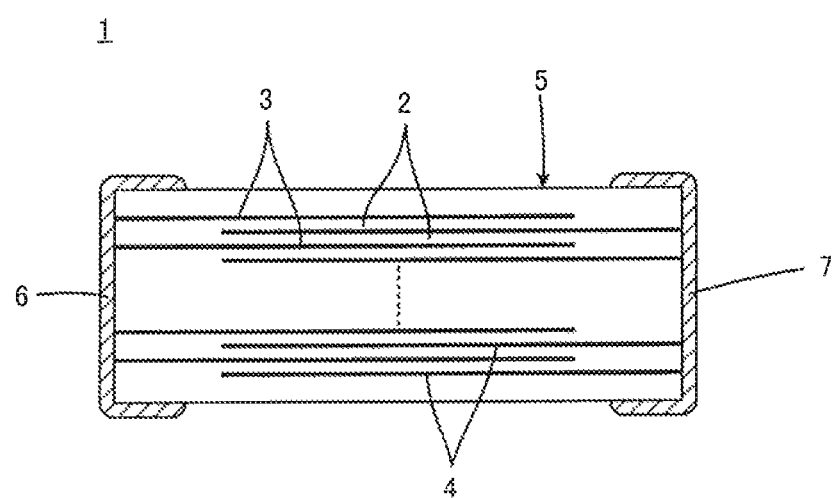

US 9,406,440 B2

DIELECTRIC CERAMIC AND LAMINATED CERAMIC CAPACITOR

This is a continuation of application Ser. No. 13/026,699, filed Feb. 14, 2011, now abandoned, the entire contents of which are incorporated herein by reference.

BACKGROUND OF THE INVENTION

1. Field of the Invention

The present invention relates to a dielectric ceramic and a laminated ceramic capacitor, and more particularly, relates to a dielectric ceramic which is suitable for reducing the size of and increasing in the capacitance of a laminated ceramic capacitor, and to a laminated ceramic capacitor composed with the use of the dielectric ceramic.

2. Description of the Related Art

In dielectric ceramics used for constituting the dielectric ceramic layers provided in laminated ceramic capacitors, $BaTiO_3$ based compounds have been used as main constituents of the dielectric ceramics in order to have a high dielectric constant. In particular, $(Ba, Ca)BaTiO_3$ obtained by the substitution of some Ba of $BaTiO_3$ with Ca can provide high reliability (high temperature load life characteristics) and favorable capacitance temperature characteristics.

Extremely severe demands have been made on laminated ceramic capacitors in recent years for a reduction in size and an increase in capacitance. For example, the demand for reduction down to 1 μm or less on the thickness of the dielectric ceramic layer has been made. As a result, the strength of the electric field applied to the dielectric ceramic layer has been increasing, thereby leading to increasingly severe design requirements for ensuring reliability.

As a means for solving the problem described above, for example, Japanese Patent Application Laid-Open No. 2005-194138 (Patent Document 1) proposes the addition of predetermined amounts of various elements such as V in a dielectric ceramic.

The dielectric ceramic proposed in Patent Document 1 is, more specifically, represented by the composition formula: $100(Ba_{1-x}C_x)_mTiO_3+aMnO+bV_2O_5+cSiO_2+dRe_2O_3$ (where the Re is at least one metal element selected from among Y, La, Sm, Eu, Gd, Tb, Dy, Ho, Er, Tm, and Yb), and the x, m, a, b, c, and d, respectively, satisfy conditions of $0.030 \leq x \leq 0.20$, $0.990 \leq m \leq 1.030$, $0.010 \leq a \leq 5.0$, $0.050 \leq b \leq 2.5$, $0.20 \leq c \leq 8.0$, and $0.050 \leq d \leq 2.5$.

However, it has been found that the dielectric ceramic just described has the following problems. Since this dielectric ceramic shows large variations in grain diameter, it has been found that in the case of using the dielectric ceramic in a laminated ceramic capacitor, the dielectric ceramic has the problems of a shortened high temperature load life (i.e., reliability) and larger variations in life when an high electric field with its strength of, for example, 15 kV/mm or more is applied while reducing the thickness of the dielectric ceramic layers to on the order of 1 μm.

SUMMARY OF THE INVENTION

Therefore, an object of the present invention is to provide a dielectric ceramic which can solve the problem described above, and a laminated ceramic capacitor composed with the use of the dielectric ceramic.

In order to solve the problem described above, the dielectric ceramic according to the ° resent invention comprises a composition of the formula: $100(Ba_{1-x}Ca_x)TiO_3+aMgO+bVO_{5/2}$, wherein $0.05 \leq x \leq 0.15$, $0.01 \leq a \leq 0.1$, and $0.05 \leq b \leq 0.5$, respectively.

The dielectric ceramic according to the present invention in accordance with a more preferable embodiment is characterized by comprising the composition: $100(Ba_{1-x}Ca_x)_mTiO_3+aMgO+bVO_{5/2}+cReO_{3/2}+dMnO+eSiO_2$, wherein the Re is at least one metal element selected from Y, La, Sm, Eu, Gd, Tb, Dy, Ho, Er, Tm, and Yb, and the x, a, b, c, d, e, and m in the composition formula respectively satisfy the conditions of $0.05 \leq x \leq 0.15$, $0.01 \leq a \leq 0.1$, $0.05 \leq b \leq 0.5$, $1.0 \leq c \leq 5.0$, $0.1 \leq d \leq 1.0$, $0.5 \leq e \leq 2.5$, and $0.990 \leq m \leq 1.030$.

The present invention is also directed to a laminated ceramic capacitor including a capacitor main body including a plurality of stacked dielectric ceramic layers and a plurality of internal electrodes formed along specific interfaces between the dielectric ceramic layers; and a plurality of external electrodes formed in different positions from each other on an outer surface of the capacitor main body and electrically connected to specific one of the internal electrodes.

The laminated ceramic capacitor according to the present invention is characterized in that the dielectric ceramic layers include the dielectric ceramic according to the present invention described above.

The dielectric ceramic according to the present invention can reduce the variation in grain diameter. Therefore, in the case of using this dielectric ceramic in a laminated ceramic capacitor, favorable high temperature load life characteristics can be obtained even when a high electric field with its strength of, for example, 15 kV/mm or more is applied, while reducing the thickness of the dielectric ceramic layer to on the order of 1 μm. More specifically, the high temperature load life can be made longer, and the variation in life can be reduced.

In accordance with a more preferable embodiment of the dielectric ceramic according to the present invention, a high dielectric constant such as, for example, 3000 or more, a high electrical insulation property such as, for example, a specific resistance (log ρ) of 10.5 Ω·m or more under an electric field strength of 10V/1.2 μm at room temperature, and favorable capacitance temperature characteristics such as a rate of change in capacitance within ±15% from −55° C. to +125° C. can be obtained, in addition to the advantageous effects described above.

BRIEF DESCRIPTION OF THE DRAWINGS

The FIGURE is a cross-sectional view schematically illustrating a laminated ceramic capacitor 1 composed with the use of a dielectric ceramic according to the present invention.

DETAILED DESCRIPTION OF THE INVENTION

A laminated ceramic capacitor 1 to which a dielectric ceramic according to the present invention is applied will be described first with reference to the FIGURE.

The laminated ceramic capacitor 1 includes a capacitor main body 5 composed of a plurality of stacked dielectric ceramic layers 2 and a plurality of internal electrodes 3 and 4 formed along specific interfaces between the dielectric ceramic layers 2. The internal electrodes 3 and 4 contain, for example, Ni, as their main constituent.

First and second external electrodes 6 and 7 are formed at different positions from each other on the outer surface of the capacitor main body 5. The external electrodes 6 and 7 contain, for example, Ag or Cu as their main constituent. Although not shown, a plating film can be formed on the external electrodes 6 and 7, if necessary. The plating film is composed of, for example, a Ni plating film and a Sn plating film formed thereon.

In the ease of the laminated ceramic capacitor 1 shown in the FIGURE the first and second external electrodes 6 and 7 are formed on the respective end surfaces of the capacitor main body 5, which are opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are arranged alternately in the stacking direction.

It is to be noted that the laminated ceramic capacitor 1 may be a two-terminal type capacitor including the two external electrodes 6 and 7, or may be a multi-terminal type capacitor including a number of external electrodes.

In this laminated ceramic capacitor 1, the dielectric ceramic layers 2 are composed of a dielectric ceramic whose composition formula 100 moles of $(Ba_{1-x}Ca_x)TiO_3$+a moles of MgO and b moles of $VO_{5/2}$, where x, a, and b respectively satisfy the conditions of $0.05 \leq x \leq 0.15$, $0.01 \leq a \leq 0.1$, and $0.05 \leq b \leq 0.5$.

This dielectric ceramic can reduce the variation in grain diameter. Therefore, the laminated ceramic capacitor 1 can provide favorable high temperature load life characteristics even when a high electric field with its strength of, for example, 15 kV/mm or more is applied and the thickness of the dielectric ceramic layer 2 is on the order of 1 μm.

While the V contained in the dielectric ceramic is advantageous for the improvement of reliability, it is likely to be in solid solution in the $BaTiO_3$ and thus cause variations in grain diameter. On the other hand, Mg is commonly used as an additive for the suppression of grain growth. As the additive amount of Mg is increased, the grain growth suppression effect is increased, but the sintering temperature is increased. Therefore, the variation in grain diameter may be increased in some cases. In particular, when a high electric field with its strength of, for example, 15 kV/mm or more is applied while reducing the thickness of the dielectric ceramic layer 2 to on the order of 1 μm, the variation in grain diameter is considered to have an increased adverse effect on reliability.

In contrast, the addition of a minute amount of Mg, such as 0.1 parts by mol or less, to 100 parts by mol of $(Ba, Ca)TiO_3$, as in the case of the composition described above, allows not only the suppression of grain growth but also a reduction in sintering temperature. The former grain growth suppression effect is a commonly known effect of Mg, whereas the latter effect of the reduction in sintering temperature is an effect opposite to the commonly known effect of Mg as described above. However, a regulated additive amount of Mg, such as 0.1 parts by mol or less, can achieve a balance between the grain growth suppression effect and the effect of the reduction in sintering temperature.

As a result, the variation in the grain diameter of the dielectric ceramic constituting the dielectric ceramic layers 2 can be reduced without causing pores in the dielectric ceramic layers 2, that is, the dielectric ceramic layers 2 can be densified. Therefore, the laminated ceramic capacitor 1 can provide favorable high temperature load life characteristics.

It is to be noted that it is not known exactly why the addition of a minute amount of Mg to $(Ba, Ca)TiO_3$ allows the sintering temperature to be lowered, as described above.

In a more preferable embodiment, the dielectric ceramic layers 2 are composed of a dielectric ceramic whose composition formula includes $100(Ba_{1-x}Ca_x)_mTiO_3$+aMgO+ $bVO_{5/2}$+$cReO_{3/2}$+dMnO+$eSiO_2$, wherein the Re is at least one metal element selected from among Y, La, Sm, Eu, Gd, Tb, Dy, Ho, Er, Tm, and Yb, and the x, a, b, c, d, e, and m are moles and $0.05 \leq x \leq 0.15$, $0.01 \leq a \leq 0.1$, $0.05 \leq b \leq 0.5$, $1.0 \leq c \leq 5.0$, $0.1 \leq d \leq 1.0$, $0.5 \leq e \leq 2.5$, and $0.990 \leq m \leq 1.030$.

With the dielectric ceramic according to the more preferable embodiment, the laminated ceramic capacitor 1 can provide a high dielectric constant such as, for example, 3000 or more, a high electrical insulation property such as, for example, a specific resistance (log ρ) of 10.5 Ω·m or more under an electric field strength of 10V/1.2 μm at room temperature, and favorable capacitance temperature characteristics such as a rate of change in capacitance within ±15% from −55° C. to +125° C., in addition to the advantageous effects described above.

It is to be noted that the dielectric ceramic according to the more preferable embodiment is advantageously used in, in particular, in the laminated ceramic capacitor 1. As a matter of course, it is also possible to use the other dielectric ceramics represented by the composition formula: $100(Ba_{1-x}Ca_x)_mTiO_3$+aMgO+$bVO_{5/2}$ in the laminated ceramic capacitor 1, than the dielectric ceramic according to the more preferable embodiment. In addition, for example, in the case of a single-layer ceramic capacitor, it can be said that it is enough to use a dielectric ceramic including the composition formula: $100(Ba_{1-x}Ca_x)_mTiO_3$+aMgO+$bVO_{5/2}$, rather than the dielectric ceramic according to the more preferable embodiment.

For the preparation of a raw material for a dielectric ceramic according to the present invention, a $(Ba, Ca)TiO_3$ based main constituent powder is produced first. For example, a solid-phase synthesis method is applied in which compound powders such as oxides, carbides, chlorides, and organic metallic compounds containing a constituent element for the main constituent are mixed at a predetermined ratio and subjected to calcination.

Compound powders are prepared such as oxides, carbides, chlorides, and organic metallic compounds containing each of Mg and V as accessory constituents, and further, if necessary or desired, Re, Mn, and Si. Then, these accessory constituent powders are mixed with the main constituent powder at a predetermined ratio to obtain a raw material powder for the dielectric ceramic.

A powder synthesized in advance by calcination is used for the $(Ba, Ca)TiO_3$ based powder as a main constituent in the raw material powder for the dielectric ceramic. More specifically, the Ca in the $(Ba, Ca)TiO_3$ is not derived from the subsequent addition of a Ca compound.

In order to produce the laminated ceramic capacitor 1, the raw material powder for the dielectric ceramic, which is obtained in the way described above, is used to produce a ceramic slurry, ceramic green sheets are formed from the ceramic slurry, these multiple ceramic green sheets are stacked to obtain a raw laminated body to serve as the capacitor main body 5, and firing the raw laminated body is carried out. In this step of firing the raw laminated body, the raw material powder for the dielectric ceramic, which is blended as described above, is fired to obtain the dielectric ceramic layers 2 composed of sintered dielectric ceramic.

A non-limiting experimental example will be described below which was carried out in accordance with the present invention.

(A) Preparation of Dielectric Raw Material Powder

First, respective powders of high-purity $BaCO_3$, $CaCO_3$, and $TiO_2$ were prepared as starting materials for the $(Ba_{1-x}Ca_x)_mTiO_3$ as a main constituent, and blended so as to provide the Ca content shown in Tables 1 to 3, that is, "Ca Modified Amount: x" and "(Ba, Ca)/Ti Ratio: m".

Next, the blended powder was dispersed uniformly by being subjected to wet mixing in a ball mill and then subjected to a drying treatment to obtain an adjusted powder. Then, the adjusted powder thus obtained was subjected to calcination at a temperature of 1000° C. to 1200° C. to obtain a main constituent powder with an average grain size of 0.20 μm and with a Ca modified amount of x as shown in Table 1.

The average grain size was obtained by observing the powder under a scanning electron microscope, and measuring the grain size (equivalent circle diameter) for 300 grains.

On the other hand, respective powders of MgO, $V_2O_5$, $Re_2O_3$, $MnCO_3$, and $SiO_2$ were prepared as accessory constituents. Also respective powders of $Y_2O_3$, $La_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$ were prepared for the $Re_2O_3$ powder.

Next, a $Re_2O_3$ powder was selected containing the Y, La, Sm, Eu, Gd, Tb, Dy, Ho, Er, Tm, and Yb shown in the column "Re" in Tables 1 to 3, and the respective powders of MgO, $V_2O_5$, $Re_2O_3$, $MnCO_3$, and $SiO_2$ were weighed so as to provide the contents a, b, c, d, and e also shown in Tables 1 to 3, and added to the main constituent powder described above to obtain a mixed powder.

Next, the mixed powder was dispersed uniformly by subjection to wet mixing in a ball mill to be, and then subjected to a drying treatment to obtain a dielectric raw material powder.

(B) Production of Laminated Ceramic Capacitor

A polyvinyl butyral based binder, a plasticizer, and ethanol as an organic solvent were added to the dielectric raw material powder, and the dielectric raw material powder with the binder, plasticizer, and organic solvent added was subjected to wet mixing in a ball mill to produce a ceramic slurry.

The ceramic slurry was subjected to sheet forming in accordance with the lip method to obtain ceramic green sheets in a rectangular shape with a thickness of 1.5 μm.

Next, a conductive paste containing Ni was applied by screen printing onto the ceramic green sheets to form conductive paste films to serve as internal electrodes.

Multiple ceramic green sheets with the conductive paste films formed thereon were stacked in such a way that the sides to which the conductive paste films were drawn were alternated, thereby providing a raw laminated body to serve as a capacitor main body.

Next, the laminated body was heated at a temperature of 350° C. for 3 hours in an $N_2$ atmosphere to burn off the binder, and then fired at the temperature shown in the column "Firing Temperature" in Tables 1 to 3 for 2 hours in a reducing atmosphere composed of a $H_2$—$N_2$—$H_2O$ gas with an oxygen partial pressure $10^{-9}$ to $10^{-12}$ MPa to obtain a sintered capacitor main body.

A Cu paste containing glass frit was then applied onto both end side surfaces of the capacitor main body described above, and fired at a temperature of 800° C. in an $N_2$ atmosphere to form external electrodes electrically connected to the internal electrodes, thereby providing laminated ceramic capacitors according to each sample shown in the tables.

The laminated ceramic capacitors thus obtained had outside dimensions of 2.0 mm in length, 1.2 mm in width, and 1.0 mm in thickness, and the dielectric ceramic layers interposed between the internal electrodes had a thickness of 1.2 μm. In addition, the number of effective dielectric ceramic layers was 5, and the area of the electrodes opposed per dielectric ceramic layer was 1.8 $mm^2$.

(C) Characterization

Next, the laminated ceramic capacitors according to each sample were evaluated as follows.

High Temperature Load Reliability Test

In a high temperature load reliability test, the change in insulation resistance with the passage of time was measured while applying a direct-current voltage of 24 V (an electric field strength of 20 kV/mm) at a temperature of 170° C. A sample was regarded as a failure when the insulation resistance value of the sample decreased to $10^5 \Omega$ or less, and the mean time to failure (MTTF) and the variation in time to failure (shape parameter: m value) were obtained from a Weibull plot.

Dielectric Constant

The capacitance of each sample was measured to calculate the dielectric constant. The measurement was carried out in such a way that an automatic bridge type measurement instrument was used to apply an alternate-current voltage of 1 $V_{rms}$ and 1 kHz at a temperature of 25° C. The dielectric constant $\in_r$ was calculated from the obtained capacitance value, the area of the internal electrode, and the thickness of the dielectric ceramic layer.

Temperature Rate of Change in Capacitance

The temperature rate of change in capacitance was measured for each sample. The measurement was carried out in such a way that the capacitance was measured while changing the temperature within the range from −55° C. to +125° C. to calculate the rate of change ($\Delta C_{TC}$) for the capacitance value ($C_{TC}$) with the maximum absolute value of change in accordance with the formula $\Delta C_{TC}=((C_{TC}-C_{25})/C_{25})$ with the capacitance value ($C_{25}$) at 25° C. as a standard.

Specific Resistance

The insulation resistance was measured for each sample to calculate the specific resistance (log ρ). The measurement was carried out in such a way that with the use of an insulation resistance meter, a direct-current voltage of 10 V was applied for 120 seconds at a temperature of 25° C. to measure the insulation resistance, and the specific resistance (log ρ) [Ω·m] was calculated from the obtained insulation resistance value, the area of the internal electrode, and the thickness of the dielectric ceramic layer.

The evaluation results are shown in Tables 1 to 3.

TABLE 1

| Sample Number | $100(Ba_{1-x}Ca_x)_mTiO_3 +$ $aMgO + bVO_{5/2} + cReO_{3/2} + dMnO + eSiO_2$ | | | | | | | Firing Temperature | High Temperature Load Life | | Dielectric Constant | Temperature Rate of Change | Specific Resistance |
|---|---|---|---|---|---|---|---|---|---|---|---|---|---|
| | x | a | b | Re | c | d | e | m | ° C. | MTTF (time) | m value | $\in_r$ | $\Delta C_{TC}$ (%) | [Ω·m] |
| *1 | 0.02 | 0.05 | 0.10 | Dy | 3.00 | 0.50 | 1.50 | 1.010 | 1250 | 12 | 0.8 | 3120 | −14.8 | 10.9 |
| *2 | 0.03 | 0.05 | 0.10 | Dy | 3.00 | 0.50 | 1.50 | 1.010 | 1240 | 30 | 0.9 | 3133 | −13.4 | 10.8 |
| 3 | 0.05 | 0.05 | 0.10 | Dy | 3.00 | 0.50 | 1.50 | 1.010 | 1200 | 41 | 2.6 | 3091 | −12.4 | 10.8 |
| 4 | 0.07 | 0.05 | 0.10 | Dy | 3.00 | 0.50 | 1.50 | 1.010 | 1200 | 44 | 3.0 | 3085 | −12.3 | 10.8 |
| 5 | 0.10 | 0.05 | 0.10 | Dy | 3.00 | 0.50 | 1.50 | 1.010 | 1200 | 40 | 2.7 | 3099 | −12.5 | 10.7 |

TABLE 1-continued

| Sample Number | 100(Ba$_{1-x}$Ca$_x$)$_m$TiO$_3$ + aMgO + bVO$_{5/2}$ + cReO$_{3/2}$ + dMnO + eSiO$_2$ | | | | | | | Firing Temperature ° C. | High Temperature Load Life | | Dielectric Constant $\epsilon_r$ | Temperature Rate of Change $\Delta C_{TC}$ (%) | Specific Resistance [Ω·m] |
|---|---|---|---|---|---|---|---|---|---|---|---|---|---|
| | x | a | b | Re | c | d | e | m | | MTTF (time) | m value | | | |
| 6 | 0.12 | 0.05 | 0.10 | Dy | 3.00 | 0.50 | 1.50 | 1.010 | 1200 | 39 | 2.8 | 3024 | −11.6 | 10.8 |
| 7 | 0.15 | 0.05 | 0.10 | Dy | 3.00 | 0.50 | 1.50 | 1.010 | 1200 | 31 | 2.5 | 3057 | −10.9 | 10.7 |
| * 8 | 0.16 | 0.05 | 0.10 | Dy | 3.00 | 0.50 | 1.50 | 1.010 | 1240 | 15 | 1.0 | 3104 | −10.3 | 10.6 |
| * 9 | 0.07 | 0.005 | 0.03 | Dy | 3.00 | 0.50 | 1.50 | 1.010 | 1240 | 9 | 2.0 | 3411 | −14.7 | 10.8 |
| * 10 | 0.07 | 0.01 | 0.03 | Dy | 3.00 | 0.50 | 1.50 | 1.010 | 1200 | 10 | 2.8 | 3014 | −13.2 | 10.9 |
| * 11 | 0.07 | 0.05 | 0.03 | Dy | 3.00 | 0.50 | 1.50 | 1.010 | 1200 | 8 | 2.5 | 3060 | −13.0 | 10.7 |
| * 12 | 0.07 | 0.10 | 0.03 | Dy | 3.00 | 0.50 | 1.50 | 1.010 | 1200 | 14 | 2.9 | 3014 | −13.5 | 10.7 |
| * 13 | 0.07 | 0.12 | 0.03 | Dy | 3.00 | 0.50 | 1.50 | 1.010 | 1240 | 12 | 2.5 | 3007 | −12.6 | 10.8 |
| * 14 | 0.07 | 0.005 | 0.05 | Dy | 3.00 | 0.50 | 1.50 | 1.010 | 1240 | 36 | 1.2 | 3475 | −14.5 | 10.7 |
| 15 | 0.07 | 0.01 | 0.05 | Dy | 3.00 | 0.50 | 1.50 | 1.010 | 1200 | 38 | 3.0 | 3078 | −11.8 | 10.8 |
| 16 | 0.07 | 0.05 | 0.05 | Dy | 3.00 | 0.50 | 1.50 | 1.010 | 1200 | 40 | 2.6 | 3101 | −12.0 | 10.8 |
| 17 | 0.07 | 0.10 | 0.05 | Dy | 3.00 | 0.50 | 1.50 | 1.010 | 1200 | 41 | 2.9 | 3142 | −11.5 | 10.8 |
| * 18 | 0.07 | 0.12 | 0.05 | Dy | 3.00 | 0.50 | 1.50 | 1.010 | 1240 | 39 | 1.3 | 3055 | −12.3 | 10.7 |
| * 19 | 0.07 | 0.005 | 0.10 | Dy | 3.00 | 0.50 | 1.50 | 1.010 | 1240 | 35 | 0.6 | 3301 | −14.6 | 10.6 |
| 20 | 0.07 | 0.01 | 0.10 | Dy | 3.00 | 0.50 | 1.50 | 1.010 | 1200 | 42 | 2.7 | 3143 | −12.8 | 10.7 |
| 21 | 0.07 | 0.10 | 0.10 | Dy | 3.00 | 0.50 | 1.50 | 1.010 | 1200 | 45 | 2.6 | 3129 | −12.1 | 10.7 |
| * 22 | 0.07 | 0.12 | 0.10 | Dy | 3.00 | 0.50 | 1.50 | 1.010 | 1240 | 40 | 1.1 | 3056 | −11.9 | 10.7 |
| * 23 | 0.07 | 0.005 | 0.50 | Dy | 3.00 | 0.50 | 1.50 | 1.010 | 1240 | 48 | 0.9 | 3343 | −14.0 | 10.6 |
| 24 | 0.07 | 0.01 | 0.50 | Dy | 3.00 | 0.50 | 1.50 | 1.010 | 1200 | 43 | 2.8 | 3102 | −12.2 | 10.7 |
| 25 | 0.07 | 0.05 | 0.50 | Dy | 3.00 | 0.50 | 1.50 | 1.010 | 1200 | 48 | 2.6 | 3110 | −12.4 | 10.6 |
| 26 | 0.07 | 0.10 | 0.50 | Dy | 3.00 | 0.50 | 1.50 | 1.010 | 1200 | 40 | 3.0 | 3083 | −11.4 | 10.6 |

TABLE 2

| Sample Number | 100(Ba$_{1-x}$Ca$_x$)$_m$TiO$_3$ + aMgO + bVO$_{5/2}$ + cReO$_{3/2}$ + dMnO + eSiO$_2$ | | | | | | | Firing Temperature ° C. | High Temperature Load Life | | Dielectric Constant $\epsilon_r$ | Temperature Rate of Change $\Delta C_{TC}$ (%) | Specific Resistance [Ω·m] |
|---|---|---|---|---|---|---|---|---|---|---|---|---|---|
| | x | a | b | Re | c | d | e | m | | MTTF (time) | m value | | | |
| * 27 | 0.07 | 0.12 | 0.50 | Dy | 3.00 | 0.50 | 1.50 | 1.010 | 1240 | 41 | 1.0 | 3013 | −11.0 | 10.7 |
| * 28 | 0.07 | 0.005 | 0.70 | Dy | 3.00 | 0.50 | 1.50 | 1.010 | 1240 | 28 | 1.1 | 3268 | −13.8 | 10.5 |
| * 29 | 0.07 | 0.01 | 0.70 | Dy | 3.00 | 0.50 | 1.50 | 1.010 | 1200 | 34 | 1.0 | 3100 | −11.4 | 10.5 |
| * 30 | 0.07 | 0.05 | 0.70 | Dy | 3.00 | 0.50 | 1.50 | 1.010 | 1200 | 35 | 0.8 | 3094 | −10.2 | 10.5 |
| * 31 | 0.07 | 0.10 | 0.70 | Dy | 3.00 | 0.50 | 1.50 | 1.010 | 1200 | 41 | 1.1 | 3046 | −10.4 | 10.6 |
| * 32 | 0.07 | 0.12 | 0.70 | Dy | 3.00 | 0.50 | 1.50 | 1.010 | 1240 | 31 | 0.7 | 3005 | −10.0 | 10.6 |
| * 33 | 0.07 | 0.05 | 0.10 | Dy | 0.80 | 0.50 | 1.50 | 1.010 | 1200 | 32 | 2.5 | 3146 | −16.2 | 10.9 |
| 34 | 0.07 | 0.05 | 0.10 | Dy | 1.00 | 0.50 | 1.50 | 1.010 | 1200 | 40 | 2.9 | 3102 | −13.1 | 10.8 |
| 35 | 0.07 | 0.05 | 0.10 | Dy | 5.00 | 0.50 | 1.50 | 1.010 | 1210 | 47 | 2.7 | 3072 | −11.2 | 10.9 |
| * 36 | 0.07 | 0.05 | 0.10 | Dy | 5.50 | 0.50 | 1.50 | 1.010 | 1210 | 45 | 2.5 | 2845 | −10.5 | 10.7 |
| * 37 | 0.07 | 0.05 | 0.10 | Dy | 3.00 | 0.08 | 1.50 | 1.010 | 1200 | 34 | 2.9 | 3210 | −16.9 | 11.0 |
| 38 | 0.07 | 0.05 | 0.10 | Dy | 3.00 | 0.10 | 1.50 | 1.010 | 1200 | 39 | 3.4 | 3158 | −13.5 | 11.0 |
| 39 | 0.07 | 0.05 | 0.10 | Dy | 3.00 | 1.00 | 1.50 | 1.010 | 1200 | 47 | 3.1 | 3059 | −11.8 | 10.6 |
| * 40 | 0.07 | 0.05 | 0.10 | Dy | 3.00 | 1.15 | 1.50 | 1.010 | 1200 | 41 | 3.3 | 2769 | −11.0 | 10.0 |
| * 41 | 0.07 | 0.05 | 0.10 | Dy | 3.00 | 0.50 | 0.30 | 1.010 | 1210 | 35 | 3.1 | 3320 | −16.5 | 10.8 |
| 42 | 0.07 | 0.05 | 0.10 | Dy | 3.00 | 0.50 | 0.50 | 1.010 | 1200 | 40 | 3.7 | 3215 | −14.2 | 10.7 |
| 43 | 0.07 | 0.05 | 0.10 | Dy | 3.00 | 0.50 | 2.50 | 1.010 | 1200 | 41 | 2.8 | 3087 | −13.9 | 10.6 |
| * 44 | 0.07 | 0.05 | 0.10 | Dy | 3.00 | 0.50 | 2.70 | 1.010 | 1190 | 33 | 3.0 | 2855 | −17.2 | 10.7 |
| * 45 | 0.07 | 0.05 | 0.10 | Dy | 3.00 | 0.50 | 1.50 | 0.987 | 1200 | 36 | 3.0 | 3075 | −12.4 | 9.9 |
| 46 | 0.07 | 0.05 | 0.10 | Dy | 3.00 | 0.50 | 1.50 | 0.990 | 1200 | 38 | 3.1 | 3058 | −12.8 | 10.6 |
| 47 | 0.07 | 0.05 | 0.10 | Dy | 3.00 | 0.50 | 1.50 | 1.030 | 1200 | 34 | 2.5 | 3094 | −14.2 | 10.9 |
| * 48 | 0.07 | 0.05 | 0.10 | Dy | 3.00 | 0.50 | 1.50 | 1.033 | 1200 | 39 | 2.7 | 3075 | −18.0 | 10.8 |
| 49 | 0.07 | 0.05 | 0.10 | Y | 1.00 | 0.50 | 1.50 | 1.010 | 1200 | 37 | 2.9 | 3120 | −12.9 | 10.7 |
| 50 | 0.07 | 0.05 | 0.10 | Y | 3.00 | 0.50 | 1.50 | 1.010 | 1200 | 39 | 2.6 | 3078 | −12.0 | 10.8 |
| 51 | 0.07 | 0.05 | 0.10 | Y | 5.00 | 0.50 | 1.50 | 1.010 | 1210 | 37 | 2.7 | 3037 | −10.2 | 10.7 |

TABLE 3

| Sample Number | 100(Ba$_{1-x}$Ca$_x$)$_m$TiO$_3$ + aMgO + bVO$_{5/2}$ + cReO$_{3/2}$ + dMnO + eSiO$_2$ | | | | | | | Firing Temperature °C. | High Temperature Load Life | | Dielectric Constant $\epsilon_r$ | Temperature Rate of Change $\Delta C_{TC}$ (%) | Specific Resistance [Ω·m] |
|---|---|---|---|---|---|---|---|---|---|---|---|---|---|
| | x | a | b | Re | c | d | e | m | | MTTF (time) | m value | | | |
| 52 | 0.07 | 0.05 | 0.10 | La | 1.00 | 0.50 | 1.50 | 1.010 | 1200 | 42 | 2.7 | 3269 | −14.6 | 10.9 |
| 53 | 0.07 | 0.05 | 0.10 | La | 3.00 | 0.50 | 1.50 | 1.010 | 1200 | 36 | 2.6 | 3154 | −13.5 | 10.9 |
| 54 | 0.07 | 0.05 | 0.10 | La | 5.00 | 0.50 | 1.50 | 1.010 | 1210 | 41 | 2.6 | 3096 | −11.9 | 10.9 |
| 55 | 0.07 | 0.05 | 0.10 | Sm | 1.00 | 0.50 | 1.50 | 1.010 | 1200 | 40 | 2.7 | 3201 | −14.2 | 10.9 |
| 56 | 0.07 | 0.05 | 0.10 | Sm | 3.00 | 0.50 | 1.50 | 1.010 | 1200 | 39 | 2.5 | 3122 | −13.4 | 10.9 |
| 57 | 0.07 | 0.05 | 0.10 | Sm | 5.00 | 0.50 | 1.50 | 1.010 | 1210 | 44 | 2.5 | 3088 | −11.8 | 10.8 |
| 58 | 0.07 | 0.05 | 0.10 | Eu | 1.00 | 0.50 | 1.50 | 1.010 | 1200 | 37 | 3.0 | 3187 | −13.9 | 10.8 |
| 59 | 0.07 | 0.05 | 0.10 | Eu | 3.00 | 0.50 | 1.50 | 1.010 | 1200 | 42 | 2.7 | 3102 | −13.1 | 10.8 |
| 60 | 0.07 | 0.05 | 0.10 | Eu | 5.00 | 0.50 | 1.50 | 1.010 | 1210 | 42 | 2.7 | 3090 | −11.8 | 10.8 |
| 61 | 0.07 | 0.05 | 0.10 | Gd | 1.00 | 0.50 | 1.50 | 1.010 | 1200 | 39 | 3.4 | 3154 | −13.6 | 10.9 |
| 62 | 0.07 | 0.05 | 0.10 | Gd | 3.00 | 0.50 | 1.50 | 1.010 | 1200 | 33 | 2.7 | 3095 | −12.7 | 10.8 |
| 63 | 0.07 | 0.05 | 0.10 | Gd | 5.00 | 0.50 | 1.50 | 1.010 | 1210 | 40 | 2.9 | 3083 | −11.2 | 10.8 |
| 64 | 0.07 | 0.05 | 0.10 | Tb | 1.00 | 0.50 | 1.50 | 1.010 | 1200 | 35 | 3.1 | 3113 | −13.0 | 10.8 |
| 65 | 0.07 | 0.05 | 0.10 | Tb | 3.00 | 0.50 | 1.50 | 1.010 | 1200 | 35 | 3.2 | 3082 | −12.3 | 10.9 |
| 66 | 0.07 | 0.05 | 0.10 | Tb | 5.00 | 0.50 | 1.50 | 1.010 | 1210 | 42 | 2.8 | 3069 | −11.4 | 10.9 |
| 67 | 0.07 | 0.05 | 0.10 | Ho | 1.00 | 0.50 | 1.50 | 1.010 | 1200 | 42 | 3.4 | 3125 | −12.9 | 10.7 |
| 68 | 0.07 | 0.05 | 0.10 | Ho | 3.00 | 0.50 | 1.50 | 1.010 | 1200 | 40 | 3.6 | 3081 | −11.5 | 10.7 |
| 69 | 0.07 | 0.05 | 0.10 | Ho | 5.00 | 0.50 | 1.50 | 1.010 | 1210 | 36 | 2.9 | 3059 | −10.8 | 10.7 |
| 70 | 0.07 | 0.05 | 0.10 | Er | 1.00 | 0.50 | 1.50 | 1.010 | 1200 | 39 | 2.8 | 3123 | −12.8 | 10.8 |
| 71 | 0.07 | 0.05 | 0.10 | Er | 3.00 | 0.50 | 1.50 | 1.010 | 1200 | 35 | 3.0 | 3071 | −12.1 | 10.7 |
| 72 | 0.07 | 0.05 | 0.10 | Er | 5.00 | 0.50 | 1.50 | 1.010 | 1210 | 37 | 3.1 | 3035 | −10.3 | 10.8 |
| 73 | 0.07 | 0.05 | 0.10 | Tm | 1.00 | 0.50 | 1.50 | 1.010 | 1200 | 38 | 2.8 | 3104 | −12.9 | 10.9 |
| 74 | 0.07 | 0.05 | 0.10 | Tm | 3.00 | 0.50 | 1.50 | 1.010 | 1200 | 34 | 2.6 | 3057 | −11.8 | 10.7 |
| 75 | 0.07 | 0.05 | 0.10 | Tm | 5.00 | 0.50 | 1.50 | 1.010 | 1210 | 32 | 3.0 | 3028 | −9.9 | 10.8 |
| 76 | 0.07 | 0.05 | 0.10 | Yb | 1.00 | 0.50 | 1.50 | 1.010 | 1200 | 35 | 2.7 | 3097 | −12.4 | 10.6 |
| 77 | 0.07 | 0.05 | 0.10 | Yb | 3.00 | 0.50 | 1.50 | 1.010 | 1200 | 37 | 3.1 | 3054 | −11.5 | 10.7 |
| 78 | 0.07 | 0.05 | 0.10 | Yb | 5.00 | 0.50 | 1.50 | 1.010 | 1210 | 33 | 2.9 | 3014 | −10.0 | 10.7 |

In Tables 1 to 3, the samples other than those which have sample numbers marked with a symbol * (hereinafter, referred to as "comparative examples") refer to samples which not only fall within the scope of the present invention, and further, but also within a more preferable range of the present invention, in which the samples are represented by the composition formula: $100(Ba_{1-x}Ca_x)_mTiO_3 + aMgO + bVO_{5/2} + cReO_{3/2} + dMnO + eSiO_2$, and the Ca modified amount x, the Mg additive amount a, the V additive amount b, the Re$_2$O$_3$ additive amount c in terms of ReO$_{3/2}$, the Mn additive amount d, the Si additive amount e, and the ratio m of (Ba, Ca)/Ti respectively satisfy the conditions of $0.05 \le x \le 0.15$, $0.01 \le a \le 0.1$, $0.05 \le b \le 0.5$, $1.0 \le c \le 5.0$, $0.1 \le d \le 1.0$, $0.5 \le e \le 2.5$, and $0.990 \le m \le 1.030$.

First, the comparative samples will be considered.

As described above, the Mg has the effects of suppressing the grain growth and lowering the sintering temperature. A Mg additive amount a less than 0.01 failed to produce the effects of the Mg addition, thereby resulting in shorter, MTTF as in the case of sample 9, or A smaller m value, as in the case of samples 14, 19, 23, and 28. On the other hand, a Mg additive amount a greater than 0.1 produced too much grain growth suppression effect of the Mg, thereby in return resulting in an increase of the firing temperature required for sintering, and resulting in larger variations in grain diameter and smaller m values, as in the case of samples 18, 22, 27, and 32.

With respect to a V contribution to an improvement of reliability, a V additive amount b of less than 0.05 failed to produce the effect of the V addition, thereby resulting in shorter MTTF, as in the case of samples 9 to 13. On the other hand, a V additive amount b greater than 0.5 produced a solid solution of a large amount of V in grains with local grain growth, resulting in larger variations in grain diameter, and thus resulting in smaller m values, as in the case of samples 28 to 32.

A Ca modified amount x of less than 0.05 failed to produce the effects of the Mg addition sufficiently, thereby resulting in shorter MTTF and smaller m values, as in the case of samples 1 and 2. On the other hand, a Ca modified amount x greater than 0.15 increased the variation in grain diameter, thereby resulting in shorter MTTF and a smaller m value, as in the case of sample 8.

When the Re$_2$O$_3$ additive amount c in terms of ReO$_{3/2}$ was less than 1.0, the absolute value of $\Delta C_{TC}$ exceeded 15%, as in the case of sample 33. On the other hand, when the Re$_2$O$_3$ additive amount c was greater than 5.0, the dielectric constant fell below 3000, as in the case of sample 36.

When the Mn additive amount d was less than 0.1, the absolute value of $\Delta C_{TC}$ was increased to more than 15%, as in the case of sample 37. On the other hand, when the Mn additive amount d was greater than 1.0, the dielectric constant fell below 3000, as in the case of sample 40, and the specific resistance (log ρ) was decreased to less than 10.5 Ω·m.

When the Si additive amount e was less than 0.5, the absolute value of $\Delta C_{TC}$ exceeded 15%, as in the case of sample 41. On the other hand, when the Si additive amount e was greater than 2.5, the dielectric constant fell below 3000, as in the case of sample 44, and the absolute value of $\Delta C_{TC}$ exceeded 15%.

When the ratio m of (Ba, Ca)/Ti was less than 0.990, the specific resistance (log ρ) decreased to less than 10.5 Ω·m, as in the case of sample 45. On the other hand, when the ratio m of (Ba, Ca)/Ti was greater than 1.030, the absolute value of $\Delta C_{TC}$ exceeded 15%, as in the case of sample 48.

In contrast to these comparative samples, the samples within the more preferable range of the present invention provided favorable results in terms of MTTF, m value, dielectric constant, $\Delta C_{TC}$, and specific resistance. In addition, as in the case of samples 49 to 78. Similar favorable results were delivered even in the case of samples in which the Re in the $Re_2O_3$ was Y, La, Sm, Eu, Gd, Tb, Ho, Er, Tm, or Yb, rather than Dy.

What is claimed is:

1. A method for manufacturing a laminated ceramic capacitor, the method comprising:
   blending Ba, Ca and Ti powders to obtain a blended powder,
   drying the blended powder to obtain an adjusted powder,
   calcining the adjusted powder to obtain a main constituent powder that includes a perovskite-type compound,
   adding a V compound and an Mg compound to the main constituent powder to obtain a mixed powder,
   drying the mixed powder to obtain a dielectric raw material powder;
   preparing a ceramic slurry by slurrying the dielectric raw material powder;
   forming the ceramic slurry into ceramic green sheets;
   forming an unfired laminated body having the ceramic green sheets and stacked conductive paste films, the conductive paste films serving as internal electrodes after firing; and
   firing the unfired laminated body to form a capacitor main body, the capacitor main body comprising a plurality of stacked dielectric ceramic layers and a plurality of internal electrodes along interfaces between the dielectric ceramic layers,
   wherein, in the main constituent powder that includes the perovskite-type compound, a molar ratio x (Ca/(Ba+Ca)) of Ca to the total amount of Ba and Ca is $0.05 \leq x \leq 0.15$, and
   wherein, in the dielectric raw material powder, when a content of Ti is regarded as 100 parts by mol, an Mg content a (parts by mol) is $0.01 \leq a \leq 0.1$, and a V content b (parts by mol) is $0.05 \leq b \leq 0.5$, and an Mn content d (parts by mol) is $0.5 \leq d \leq 1.0$.

2. A laminated ceramic capacitor manufactured by the method according to claim 1.

3. A method for manufacturing a laminated ceramic capacitor, the method comprising:
   blending Ba, Ca and Ti powders to obtain a blended powder,
   drying the blended powder to obtain an adjusted powder,
   calcining the adjusted powder to obtain a main constituent powder that includes a perovskite-type compound,
   adding a V compound, an Mg compound, a Re compound, an Mn compound and an Si compound to the main constituent powder to obtain a mixed powder,
   drying the mixed powder to obtain a dielectric raw material powder;
   preparing a ceramic slurry by slurrying the dielectric raw material powder;
   forming the ceramic slurry into ceramic green sheets;
   forming an unfired laminated body having the ceramic green sheets and stacked conductive paste films, the conductive paste films serving as internal electrodes after firing; and
   firing the unfired laminated body to form a capacitor main body, the capacitor main body comprising a plurality of stacked dielectric ceramic layers and a plurality of internal electrodes along interfaces between the dielectric ceramic layers,
   wherein, in the main constituent powder that includes the perovskite-type compound, a molar ratio x (Ca/(Ba+Ca)) of Ca to a total amount of Ba and Ca is $0.05 \leq x \leq 0.15$, a molar ratio m ((Ba+Ca)/Ti) of a total amount of Ba and Ca to Ti is $0.990 \leq m \leq 1.030$,
   wherein, in the dielectric raw material powder, when a content of Ti is regarded as 100 parts by mol, an Mg content a (parts by mol) is $0.01 \leq a \leq 0.1$, a V content b (parts by mol) is $0.05 \leq b \leq 0.5$, a Re content c (parts by mol) is $1.0 \leq c \leq 5.0$, an Mn content d (parts by mol) is $0.5 \leq d \leq 1.0$, and an Si content e (parts by mol) is $0.5 \leq e \leq 2.5$, and
   wherein Re is at least one metal element selected from the group consisting of Y, La, Sm, Eu, Gd, Tb, Dy, Ho, Er, Tm, and Yb.

4. A laminated ceramic capacitor manufactured by the method according to claim 3.

* * * * *